United States Patent
Kadatoka et al.

(10) Patent No.: US 11,200,052 B1
(45) Date of Patent: Dec. 14, 2021

(54) DOCUMENTATION ENFORCEMENT DURING COMPILATION

(71) Applicant: American Express Travel Related Services Company, Inc., New York, NY (US)

(72) Inventors: Chetana Kadatoka, Phoenix, AZ (US); Anurag Mandloi, Phoenix, AZ (US); Buddhika Rathnayaka, Phoenix, AZ (US); Sriram Sundararajan, Phoenix, AZ (US); Avishekh Tewari, Phoenix, AZ (US); Anthony Wooten, Phoenix, AZ (US)

(73) Assignee: AMERICAN EXPRESS TRAVEL RELATED SERVICE COMPANY, INC, New York, NY (US)

( * ) Notice: Subject to any disclaimer, the term of this patent is extended or adjusted under 35 U.S.C. 154(b) by 0 days.

(21) Appl. No.: 17/169,027

(22) Filed: Feb. 5, 2021

(51) Int. Cl.
*G06F 8/73* (2018.01)
*G06F 8/41* (2018.01)
*G06F 8/71* (2018.01)

(52) U.S. Cl.
CPC .............. *G06F 8/73* (2013.01); *G06F 8/427* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 6,993,710 B1* | 1/2006 | Coad | ........................ | G06F 8/71 715/202 |
| 9,086,885 B2* | 7/2015 | Canter | ...................... | G06F 8/33 |
| 9,747,098 B2* | 8/2017 | Schaefer | ............... | G06F 16/148 |
| 10,528,342 B2* | 1/2020 | Lakshmanan | ............. | G06F 8/71 |
| 2008/0086718 A1* | 4/2008 | Bostick | ...................... | G06F 8/71 717/120 |
| 2014/0173561 A1* | 6/2014 | Toub | ......................... | G06F 8/73 717/123 |
| 2015/0040101 A1* | 2/2015 | Rummler | ............. | G06Q 10/101 717/113 |
| 2016/0179828 A1* | 6/2016 | Ellis | ...................... | G06F 16/122 707/695 |

\* cited by examiner

*Primary Examiner* — Marina Lee
(74) *Attorney, Agent, or Firm* — Thomas | Horstemeyer, LLP

(57) ABSTRACT

Disclosed are approaches for enforcing requirements that documentation be up to date. In response to initiation of a build process for an application, a source-code file associated with the application is evaluated to determine an identifier and a location for a corresponding documentation file. A determination can be made regarding whether the documentation file exists at the location. Another determination can be made regarding whether each function specified in the source-code file has a corresponding entry in the documentation file. The build process can be halted in response to determining that at least one function specified in the source-code file fails to have the corresponding entry in the documentation file. If the build process is halted, a message can be displayed on the computing device, the message identifying the at least one function specified in the source-code file that fails to have the corresponding entry in the documentation file.

20 Claims, 3 Drawing Sheets

DOCUMENTATION ENFORCEMENT DURING COMPILATION

BACKGROUND

Documentation is often needed in order for developers to make use of application programming interfaces (APIs) for services or libraries provided by others. Without documentation, a developer may be unaware of the existence of functionality provided through the API, the arguments needed to invoke specific functions, or the type of data that is returned by a function invoked by the developer. However, documentation is often difficult to maintain during the development process as software is modified and functions provided by an API are added, removed, or changed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for determining whether documentation for software, such as application programming interfaces for services or libraries, are being created and/or maintained. When the build process for a service or library is initiated, the source code for the service or library can be evaluated. For example, the source code could be evaluated to determine whether documentation exists in a location specified by the source code. As another example, the sourced code could be analyzed to identify individual functions. The presence of these functions in the documentation could then be determined. Similarly, the source code could be analyzed to confirm whether a function present in the documentation lists the correct arguments (e.g., number of arguments, type of arguments, etc.), the correct return value (e.g., returns an integer, returns a pointer to a data structure, etc.), and/or the correct return code (e.g., a hypertext transfer protocol (HTTP) status code). If these checks reveal an inconsistency between the source code and the documentation, then the build process can be halted and a message can be shown on a display of the client device of the developer.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
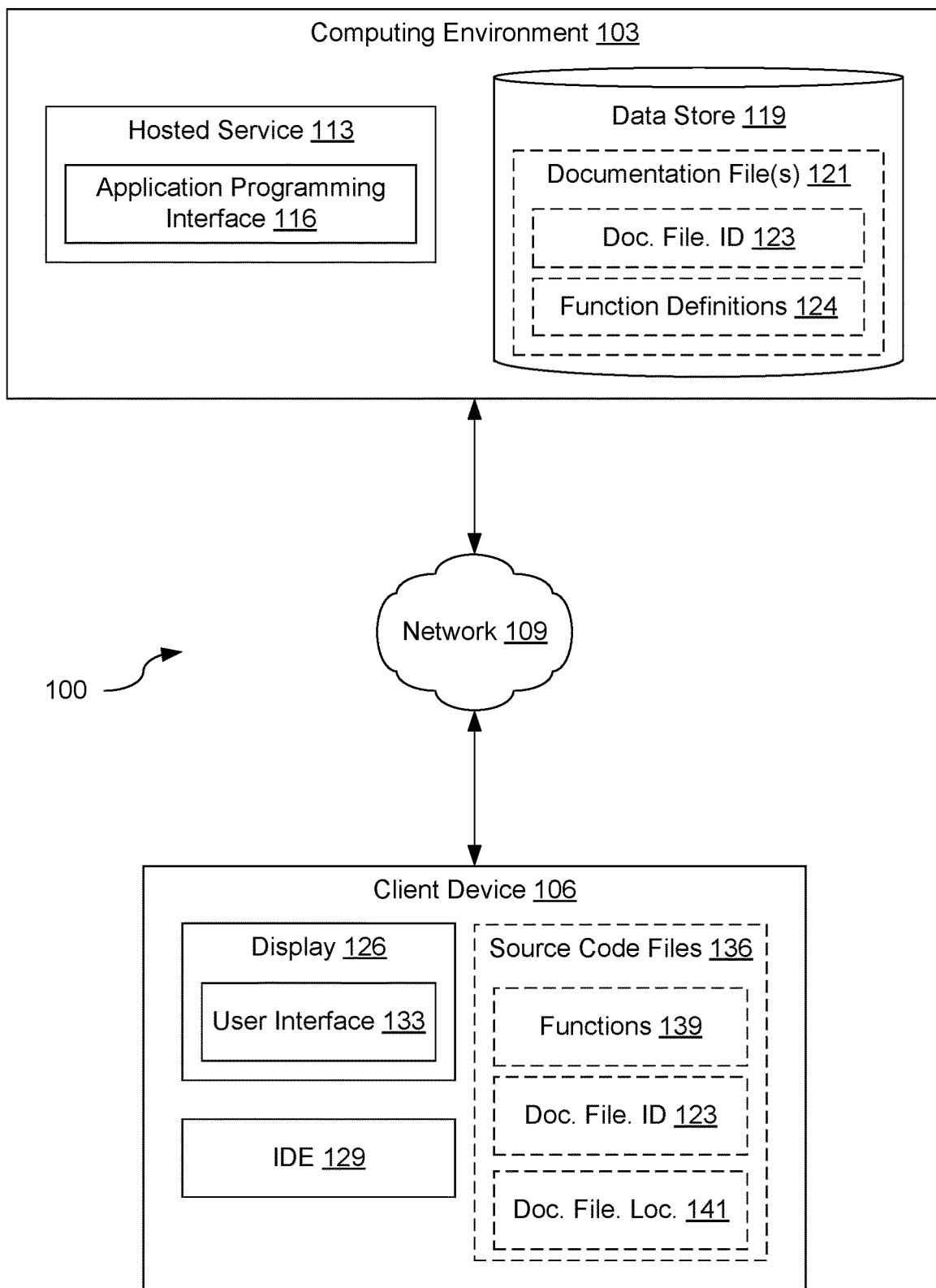
FIG. 1 is a drawing of a network environment according to various embodiments of the present disclosure.

With reference to FIG. 1, shown is a network environment 100 according to various embodiments. The network environment 100 can include a computing environment 103, and at least one client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a hosted service 113, and other applications, services, processes, systems, engines, or functionality not discussed in detail herein.

The hosted service 113 can be executed to perform operations on behalf of other applications or users. For instance, the hosted service 113 could represent an application or server that can process data or provide access to date in response to requests. In these instances, the hosted service 113 could represent a web application or web service. Accordingly, the hosted service 113 can provide an application programming interface 116 to expose the functionality it provides to other applications or users.

The application programming interface 116 can provide an interface for other applications to interact with and/or make use of the functionality provided by the hosted service 113. It can define the kinds of function calls or requests that can be made by other applications, how to make them, the data formats that should be used, the conventions to follow, etc. When a function provided or exposed by the application programming interface 116 is called, the hosted service 113 can perform the operations specified by the called function and return the specified type of result.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include one or more documentation files 121, and potentially other data.

A documentation file 121 can represent a file that provides documentation for the hosted service 113, including the application programming interface 116 provided by the hosted service 113. The documentation file 121 could include a documentation file identifier 123 and one or more function definitions 124. The documentation file identifier 123 is an identifier for the documentation file 121 that uniquely identifies the documentation file 121 with respect to other documentation files 121. Examples of documentation file identifiers include filenames, cryptographic hashes, globally unique identifiers (GUIDs) or universally unique identifiers (UUIDs), etc. In some instances, the filename could be human readable (e.g., "filename1") or it could be a cryptographic hash, GUID, or UUID. A function definition 124 can define or identify a function provided by an API 116. The function definition 124 could include the name of the function, the parameters or arguments for the function (e.g., the names, numbers, and data types of the parameters or arguments), and the expected return data type (e.g., the function returns an integer value, a floating point value, a data structure or object, etc.) of value (e.g., the function returns value of zero or one), if any. One example of a documentation file 121 is a Swagger or OpenAPI file, which are JSON files comprising an interface description language for describing representational state transfer (REST) APIs, which could include the API 116 provided by the hosted service 113.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability. The client device 106 can include one or more displays 126, such as liquid crystal displays (LCDs), gas plasma-based flat panel displays, organic light emitting diode (OLED) displays, electrophoretic ink ("E-ink") displays, projectors, or other types of display devices. In some instances, the display 126 can be a component of the client device 106 or can be connected to the client device 106 through a wired or wireless connection.

The client device 106 can be configured to execute various applications, such as an integrated development environment (IDE) 129 or other applications. The IDE 129 can be executed by a client device 106 to facilitate the development of software applications by a user of the client device 106. The IDE 129 could provide a number of facilities to a user, including a source code editor, build and build automation tools, a debugger, a compiler and/or interpreter. Accordingly, the IDE 129 could cause a user interface 133 to be shown on the display 126, thereby allowing the user to interact with the IDE 129 and view messages presented by the IDE 129 to the user.

One or more source code files 136 can also be stored on the client device 106 for use with the IDE 129. A source code file 136 can represent a text file written using a human-readable programming language that, when evaluated by a compiler or interpreter, is converted into machine-readable instructions that can be executed by a computing device to cause the computing device to perform one or more operations. In some implementations, copies of the source code files 136 can also be stored in a version control system. In these implementations, the IDE 129 could retrieve copies of the source code files 136 from the version control system for editing or building by the IDE 129. Changes to the source code files 136 could then be saved or committed to the version control system for future use. Accordingly, a source code file 136 can include one or more functions 139, a document file identifier 123, and a document file location 141.

A function 139 can represent any collection, set, or combination of instructions within the source code file 136 that can be converted to machine-readable instructions in order to perform a specific task. A function 139 can include a function name, a return value, a return code, one or more arguments or parameters, as well as a series of instructions. The return value can represent the data, if any, returned by the functions. For example, if a function 139 calculated the product of two integers provided as arguments, then the return value for the function 139 could represent that the function 139 would return an integer as a result upon completion. The return code can represent additional return data, such as hypertext transfer protocol (HTTP) status codes, that a function 139 might return. The function name can differentiate the function 139 from other functions 139 specified in the source code file 136. For languages that allow for function or operator overloading, the function name can be used in conjunction with the function arguments and/or return value to differentiate the function 139 from other functions 139.

A documentation file location 141 can specify the location of a respective or corresponding documentation file 121 for the source code file 136. Examples of documentation file locations 141 include relative or absolute filepaths, index or primary keys for a data store 119, etc.

Next, a general description of the operation of the various components of the network environment 100 is provided. Although the following paragraphs provide an example of the operation of and interaction between the various components of the present disclosure, they can operate or interact in other manners. A more detailed description of the operation of the individual components of the present disclosure is provided in the paragraphs discussing FIG. 2 and FIG. 3.

To begin, a user of the IDE 129 can edit one or more source code files 136. This could be done as part of the development of the hosted service 113, such as be creating an API 116 that can provided access to the hosted service 113 to others. As individual source code files 136 are edited, the user should be updating respective or corresponding documentation files 121, although this may not always happen.

Subsequently, the user of the IDE 129 can initiate a build of the hosted service 113 from the source code files 136. Prior to, or concurrently with, initiation of the build process, the IDE 129 can analyze the functions 139 of the source code files 136 and compare the functions 139 with the function definitions 124 in the respective or corresponding documentation files 121. For example, the IDE 129 can determine whether a documentation file 121 exists for a respective source code file 136, whether a function 139 in a source code file 136 has an appropriate function definition 124 in the respective or corresponding documentation file 121, and potentially other checks.

If one or more of these checks fail, the IDE 129 can halt the build and present or show an error message to the user within the user interface 133 of the display 126. For example, the IDE 129 could halt proceeding to the next stage in the build process (e.g., linking or compilation) or could halt a build process running in parallel. The IDE 129 could then present the error message to the user detailing the issue(s) with the documentation file(s) 121 or the source code files 136. By reviewing the adequacy of the documentation file 121 as part of the build process, and halting the build process if a documentation file 121 is inadequate, the IDE 129 can force a user to maintain the documentation files 121 for their source code files 136 concurrently with any changes that may be made to the documentation files 121.

Figure 2:
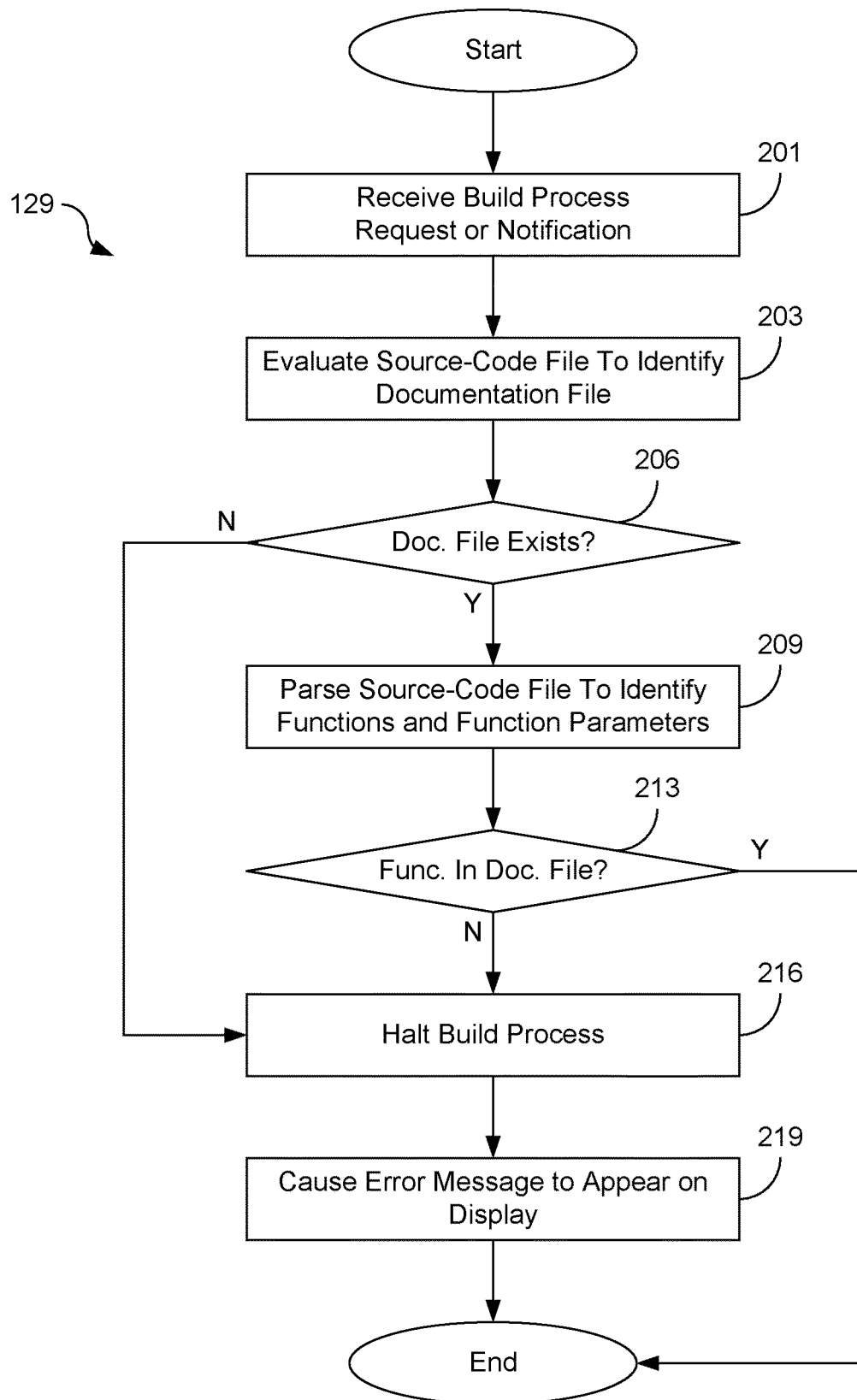
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the IDE 129. The flowchart of FIG. 2 provides merely an example of the many different types of functional arrangements that can be employed to implement the operation of the depicted portion of the IDE 129. As an alternative, the flowchart of FIG. 2 can be viewed as depicting an example of elements of a method implemented within the network environment 100.

Beginning with block 201, the IDE 129 could receive a notification that a build of an application has been initiated, a request to initiate a build of an application, or similar notification. For example, a user could manipulate a user interface 133 provided by the IDE 129 to initiate a build of an application (e.g., the hosted service 113) from one or source code files 136 stored on the client device 106. In response to the manipulation of the user interface 133, the IDE 129 could determine that the user wishes to initiate the build and begin the build process. The IDE 129 could then send a build notification to a compiler or interpreter within the IDE 129 to begin building the application (e.g., the hosted service 113) from the source code files 136.

Then at block 203, the IDE 129 can evaluate each source code file 136 to identify a respective or corresponding documentation file 121. For example, the IDE 129 could parse or otherwise evaluate the text of individual source code files 136 to determine or identify the document file identifier 123 and document file location 141 for the respective or corresponding documentation file 121. This could be done prior to the build process beginning in order to prevent the hosted service 113 from being built by the IDE 129 when the corresponding or respective documentation files 121 are missing or incomplete.

Next at block 206, the IDE 129 can determine whether the respective or corresponding documentation file 121 for each source code file 136 exists. This can be done by checking for the presence of a documentation file 121 with a matching documentation file identifier 123 at the specified document file location 141. If the documentation file 121 does not exist, then the process skips to block 216 in order to halt the build process of the application (e.g., the hosted service 113) from the source code files 136. However, if the documentation file 121 does exist, then the process proceeds to block 209.

Moving on to block 209, the IDE 129 can parse or otherwise evaluate the source code file 136 to identify individual functions 139 within the source code file 136, as well as the parameters or arguments, return values, and/or return codes for the individual functions 139. In some implementations, the IDE 129 could rely on a parser used by a compiler included in the IDE 129 to identify the individual functions 139 and their parameters or arguments, return values, and/or return codes. In other implementations, the IDE 129 could utilize a separate parser in order to independently evaluate the source code file 136 to separate the build process from the process described in FIG. 2.

Proceeding to block 213, the IDE 129 can determine whether each function 139 identified in the source code file 136 at block 209 has a respective function definition 124 in the respective or corresponding documentation file 121 identified at block 203. For example, the IDE 129 could parse the documentation file 121 to determine whether a function definition 124 exists that matches the name of a function 139 identified in the source code file 136. If a matching name is identified, the IDE 129 could further evaluate whether the function definition 124 specifies the same number and type of arguments that the function 139 in the source code file 136 specifies. The IDE 129 could further determine whether the names of each argument or parameter listed in the function definition 124 matches a respective argument or parameter name of the function 139 of the source code file 136.

If any of these checks fail, the IDE 129 could determine that the function 139 in the source code file 136 does not have a respective function definition 124 in the documentation file 121. This could result from number of events. For example, a respective or corresponding function definition 124 may not have been created for the function 139. As another example, a function definition 124 may not have been updated to reflect changes made to the corresponding or respective function 139 in the source code file 136. Accordingly, if a check fails, the IDE 129 could determine that the function 139 fails to have a respective or corresponding function definition 124 in the documentation file 121. In this scenario, the process could proceed to block 216 so that the IDE 129 can halt the build process. However, if all of these checks pass for each function 139 in the source code file 136, then the IDE 129 could determine that the documentation file 121 is up to date. In this scenario, the process depicted in FIG. 2 would end and the build could continue.

If the process of FIG. 2 proceeds to block 216, the IDE 129 can cause the build process to halt. This could be done using several approaches. For example, if the process of FIG. 2 were implemented as a pre-build process, the IDE 129 could not move on to the next process by failing to instruct or cause the compiler or interpreter to begin building the application from the source code files 136. If the process of FIG. 2 were implemented as a parallel process performed simultaneously with compilation, linking, and/or interpretation, then the IDE 129 could send a message to the compiler, linker, and/or interpreter to halt the current build.

Finally, at block 219, the IDE 129 could cause a message to be shown on the display 126 of the client device. For example, the message could be shown within the user interface 133 of the IDE 129. The message could notify the user of the mismatch between the documentation file 121 and the respective source code file 136. For example, the message could specify the identity of the function 139 that lacks a function definition 124 in the documentation file 121 or has a mismatched function definition 124 in the documentation file 121. In some implementations, the message could also provide additional information about the nature of the mismatch, such as whether a function definition 124 were missing from the documentation file 121, or a function definition 124 failed to match a function 139 within the source code file 136. Once the message is shown on the display, the process of FIG. 2 could end.

Figure 3:
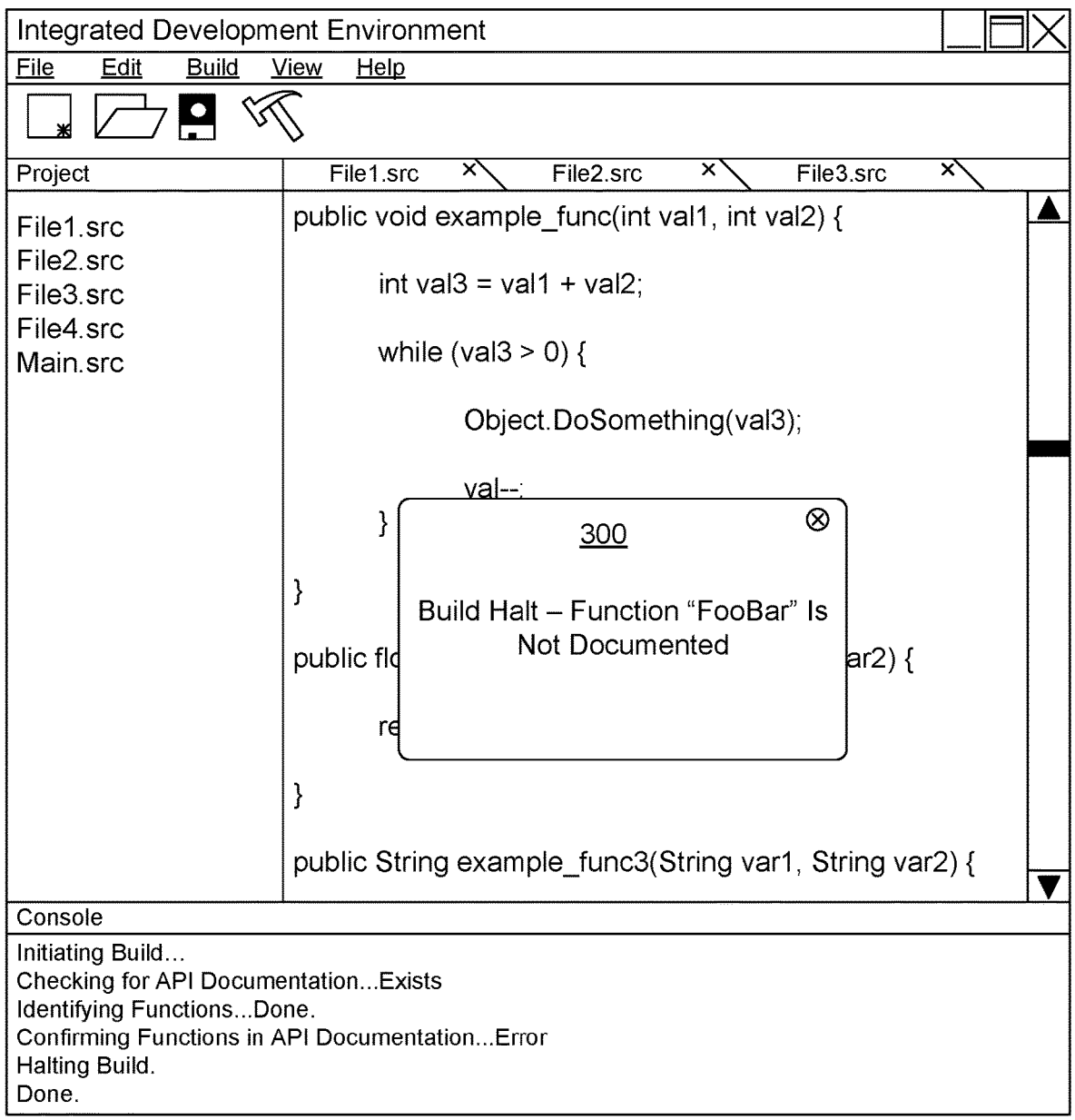
FIG. 3 is a pictorial diagram of an example user interface rendered by a client in the network environment of FIG. 1 according to various embodiments of the present disclosure.

FIG. 3 depicts an example of a user interface 133 for the IDE 129 according to various embodiments of the present disclosure. This example of a user interface 133 depicts an example of a message 300 being shown to the user at block 219 of FIG. 2 after the build process had been halted at block 216 of FIG. 2. As depicted, the message 300 could provide the user with a description of the problem and/or identify a specific function 139 that is the source of the problem. For example, the message 300 could specify that one or more functions 139 are not documented or are otherwise missing function definitions 124 in a respective or corresponding documentation file 121. As another example, the message 300 could specify that one or more functions 139 have arguments or parameters that are not defined or identified in the respective or corresponding function definition 124 of a respective or corresponding documentation file 121. Similarly, the message 300 could specify that one or more functions 139 have return values or return codes that differ from what is defined in the respective or corresponding function definition 124 of a respective or corresponding documentation file 121. In any of these examples, the message 300 could also provide the name of the function 139 or functions 139 at issue and/or the documentation file identifier 123 for the documentation file 121 at issue. The message 300 could also indicate that the build process has been halted as a result, thereby prompting the user to update the documentation file 121.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X and/or Y; X and/or Z; Y and/or Z; X, Y, and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor, a memory, and a display; and
   machine-readable instructions stored in the memory that, when executed by the processor, cause the computing device to at least:
   in response to an initiation of a build process for an application, evaluate a source-code file associated with the application to determine an identifier and a location for a corresponding documentation file;
   determine that the documentation file exists at the location;
   determine whether each function specified in the source-code file has a corresponding entry in the documentation file;
   halt the build process in response to a determination that at least one function specified in the source-code file fails to have the corresponding entry in the documentation file; and
   cause a message to appear on the display of the computing device, the message identifying the at least one function specified in the source-code file that fails to have the corresponding entry in the documentation file.

2. The system of claim 1, wherein the machine-readable instructions that cause the computing device to determine whether each function specified in the source-code file has a corresponding entry in the documentation file further cause the computing device to at least:
   parse the source-code file to identify a function name for the at least one function; and
   parse the documentation file to determine that the function name is missing from the documentation file.

3. The system of claim 1, wherein the machine-readable instructions that cause the computing device to determine whether each function specified in the source-code file has a corresponding entry in the documentation file further cause the computing device to at least:
   parse the source-code file to identify one or more arguments for the at least one function; and
   parse the documentation file to determine that the one or more arguments are missing from the corresponding entry in the documentation file for the at least one function.

4. The system of claim 1, wherein the machine-readable instructions that cause the computing device to determine whether each function specified in the source-code file has a corresponding entry in the documentation file further cause the computing device to at least:
   parse the source-code file to identify a return value type for the at least one function; and
   parse the documentation file to determine that the return value type for the at least one function is missing from the documentation file for the at least one function.

5. The system of claim 1, wherein the machine-readable instructions that cause the computing device to halt the build process further cause the computing device to fail to begin compilation of the source-code file.

6. The system of claim 1, wherein the machine-readable instructions that cause the computing device to halt the build process further cause the computing device to send a message to a linker or a compiler to halt operation.

7. The system of claim 1, wherein the documentation file is formatted using a markup language.

8. A method implemented using a computing device, the method comprising:
   in response to an initiation of a build process for an application, evaluating a source-code file associated with the application to determine an identifier and a location for a corresponding documentation file;
   determining that the documentation file exists at the location;
   determining whether each function specified in the source-code file has a corresponding entry in the documentation file;

halting the build process in response to a determination that at least one function specified in the source-code file fails to have the corresponding entry in the documentation file; and causing a message to appear on a display of the computing device, the message identifying the at least one function specified in the source-code file that fails to have the corresponding entry in the documentation file.

9. The method of claim 8, wherein determining whether each function specified in the source-code file has a corresponding entry in the documentation file further comprises:

parsing the source-code file to identify a function name for the at least one function; and parsing the documentation file to determine that the function name is missing from the documentation file.

10. The method of claim 8, wherein determining whether each function specified in the source-code file has a corresponding entry in the documentation file further comprises:

parse the source-code file to identify one or more arguments for the at least one function; and parse the documentation file to determine that the one or more arguments are missing from the corresponding entry in the documentation file for the at least one function.

11. The method of claim 8, wherein determining whether each function specified in the source-code file has a corresponding entry in the documentation file further comprises:

parsing the source-code file to identify a return value type for the at least one function; and parsing the documentation file to determine that the return value type for the at least one function is missing from the documentation file for the at least one function.

12. The method of claim 8, wherein halting the build process further comprises failing to begin compilation of the source-code file.

13. The method of claim 8, wherein halting the build process further comprises sending a message to a linker or a compiler to halt operation.

14. The method of claim 8, wherein the documentation file is formatted using a markup language.

15. A non-transitory, computer-readable medium, comprising machine-readable instructions that, when executed by a processor of a computing device, cause the computing device to at least:

in response to an initiation of a build process for an application, evaluate a source-code file associated with the application to determine an identifier and a location for a corresponding documentation file;

determine that the documentation file exists at the location;

determine whether each function specified in the source-code file has a corresponding entry in the documentation file;

halt the build process in response to a determination that at least one function specified in the source-code file fails to have the corresponding entry in the documentation file; and cause a message to appear on a display of the computing device, the message identifying the at least one function specified in the source-code file that fails to have the corresponding entry in the documentation file.

16. The non-transitory, computer-readable medium of claim 15, wherein the machine-readable instructions that cause the computing device to determine whether each function specified in the source-code file has a corresponding entry in the documentation file further cause the computing device to at least:

parse the source-code file to identify a function name for the at least one function; and parse the documentation file to determine that the function name is missing from the documentation file.

17. The non-transitory, computer-readable medium of claim 15, wherein the machine-readable instructions that cause the computing device to determine whether each function specified in the source-code file has a corresponding entry in the documentation file further cause the computing device to at least:

parse the source-code file to identify one or more arguments for the at least one function; and parse the documentation file to determine that the one or more arguments are missing from the corresponding entry in the documentation file for the at least one function.

18. The non-transitory, computer-readable medium of claim 15, wherein the machine-readable instructions that cause the computing device to determine whether each function specified in the source-code file has a corresponding entry in the documentation file further cause the computing device to at least:

parse the source-code file to identify a return value type for the at least one function; and parse the documentation file to determine that the return value type for the at least one function is missing from the documentation file for the at least one function.

19. The non-transitory, computer-readable medium of claim 15, wherein the machine-readable instructions that cause the computing device to halt the build process further cause the computing device to send a message to a linker or a compiler to halt operation.

20. The non-transitory, computer-readable medium of claim 15, wherein the machine-readable instructions that cause the computing device to halt the build process further cause the computing device to fail to begin compilation of the source-code file.

* * * * *